United States Patent [19]
Delfeld

[11] 3,760,920
[45] Sept. 25, 1973

[54] POWER SHAFT COUPLING AND UNCOUPLING MECHANISM
[75] Inventor: William H. Delfeld, Bellevue, Wash.
[73] Assignee: The Boeing Company, Seattle, Wash.
[22] Filed: Aug. 14, 1972
[21] Appl. No.: 280,690

[52] U.S. Cl............ 192/93 R, 192/89 A, 192/99 R, 192/14, 192/67, 192/48.5, 64/23
[51] Int. Cl.............................................. F16d 19/00
[58] Field of Search.................. 64/9, 23; 192/93 R, 192/99 A, 99 B, 99 R, 47 R, 89 A, 48.1, 67, 48.5

[56] References Cited
UNITED STATES PATENTS

| 876,053 | 1/1908 | Heard | 192/89 A |
|---|---|---|---|
| 1,868,254 | 7/1932 | Reaves | 192/47 |
| 2,260,770 | 10/1941 | Brownlee | 192/89 A |
| 2,398,716 | 4/1946 | Ojutkangas | 192/48.5 |
| 2,906,106 | 9/1959 | Heas | 64/8 |

Primary Examiner—Charles J. Myhre
Assistant Examiner—Randall Heald
Attorney—Kenneth W. Thomas et al.

[57] ABSTRACT

A power shaft coupling arrangement, specifically designed for marine use, which can shift axially for connecting and disconnecting an engine and a transmission so as to allow operation of the engine separately from the transmission. To disconnect or uncouple the shaft arrangement, a locking means at the engine end of the shaft is moved to a stowed position. A shift means carrying a yoke is cammed into engagement with a shift land on the shaft so as to shift the power shaft axially for separating crown tooth couplings at each end of the power shaft from the corresponding teeth on the engine and transmission units. Support blocks and the yoke keep the shaft in correct alignment so that engine and transmission are both disconnected from the shaft. In addition, a seal arrangement on the transmission end of the power shaft arrangement is engaged with either the transmission unit or a support unit so as to seal the engine end of the shaft against water splash from the transmission end while the shaft is either in coupled or in uncoupled position.

10 Claims, 3 Drawing Figures

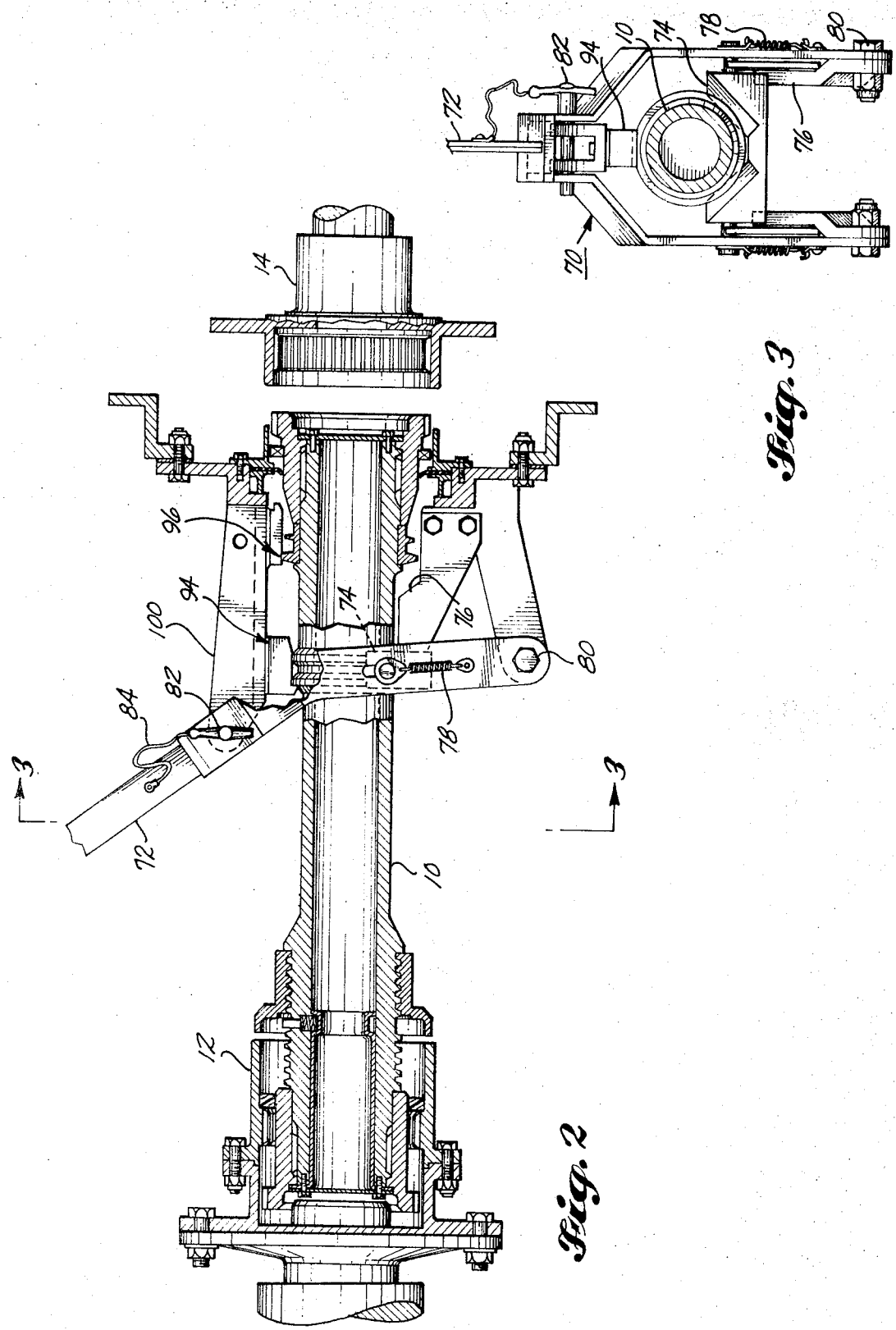

POWER SHAFT COUPLING AND UNCOUPLING MECHANISM

BACKGROUND OF THE INVENTION

This invention relates to a power shaft coupling mechanism which utilizes locking means and shifting means for connecting or disconnecting a drive means from a driven means. The particular design and arrangement was developed for marine craft where seals are required for keeping water seepage to a minimum.

The problem of being able to uncouple the engine from the transmission and to couple the same within seconds occurred in the design and development of a hydrofoil boat. The boat carried an engine in the hull and a transmission located at the upper part of the hydrofoil strut. When the hydrofoil is foilborne the engine is coupled to the transmission by a shaft and the transmission carries a vertical shaft through the strut which accordingly drives propellers at the foil. When the hydrofoil becomes hullborne the drag of the strut became too large so that the struts were pulled up which of course required a fast disconnect between the transmission mounted atop of the strut and the engine in the hull. Accordingly, the unique solution as disclosed hereinafter was invented, developed, and actually reduced to practice.

The particularly proposed form of a shiftable power shaft coupling arrangement as described in the abstract and explained in further detail hereinafter was not noted during the course of a patent search. Thus, the mentioned references are only of general interest to the basic subject of coupling arrangements between drive and driven units which are separable or capable of decoupling to interrupt the power train between the drive and driven units. For example, the patent to HAAS, U.S. Pat. No. 2,906,106, shows a power shaft coupling 11 which is axially shiftable to separate matching crown gear units in coupler mechanisms 26, 26'; however, the coupler unit 26 must be partially disassembled prior to the shifting of shaft 11.

The patent to REAVES, U.S. Pat No. 1,868,254, shows a representative example of an automative free wheeling drive coupling arrangement involving a shiftable unit, in this case a screw nut arrangement, which permits separation of a single joint in the power train between the drive and driven shafts 2 and 8, respectively, while the patent to TROEMNER ET AL, U.S. Pat. No. 3,059,742, provides the only noted showing relative to a power shaft coupling arrangement involving a plural or double-ended decoupling system; however, this system employs a clutch at one end of the power shaft unit which is recoupled after the coupling unit at the other end of this shaft is decoupled.

SUMMARY OF THE INVENTION

The present invention relates to a power shaft coupling arrangement which is shiftable axially to connect and disconnect an engine and a transmission so as to allow operation of the engine separately from the transmission. To disconnect the shaft arrangement, a spring pin at the engine end of the shaft is manually depressed so that a threaded collar can be moved forward to a stowed position where it is again locked in position by the spring pin. A lock pin is then removed from the shift handle which can then be pivoted whereby a yoke carried by the shift handle is cammed into engagement with a shift land on the shaft so as to shift the power shaft axially for separating crown tooth couplings at each end of the power shaft from the corresponding teeth on the engine and transmission units. The shift handle is then locked in this disconnected position by reinserting the lock pin. The uncoupled position of the shaft places the shift land also in locked condition with upper support means directly opposite of the yoke, so that the shaft does not tip and stays in aligned axially displaced position. Furthermore, there is a seal arrangement on the transmission end of the power shaft arrangement, mounted to either the transmission unit or a support unit, so as to seal the engine end of the shaft against water splash from the transmissioned end while the shaft is either connected or disconnected.

The problems solved by this invention are as follows: a) to provide a mechanism which will connect and disconnect a power shaft between an engine and a transmission; b) to lock the shaft in either the connected or disconnected position; c) to allow relative motion of the transmission with respect to the engine while the shaft is connected, whether operating or not; d) to seal the engine end of the shaft against water splash from the transmission end while the shaft is connected or disconnected; e) to allow operation of the engine while the shaft is disconnected, and f) to engage the shaft to the engine and the transmission in the coupled position and to disengage the shaft from the transmission but also from the engine in the uncoupled or disconnected position.

Prior attempts to solve this complex problem have failed for several reasons: a) the mechanism provided to shift the shaft between connected and disconnected positions consisted of support and shift anti-friction bearings and required many precision parts, a complete bearing lubrication and scavenge System; b) attempts to combine the shift mechanism and bearings with a flexible coupling type shaft resulted in much space being used for the bearings and a short coupling which generates excessive heat when operating with misalignment caused by transmission motions, which resulted in short coupling life; c) attempts at providing an operating seal against water splash involved complicated seal assemblies as a part of the shaft support bearings and a static seal arrangement that did not function while the shaft was disconnected.

It is therefore a primary object of the present invention to provide for a power shaft coupling arrangement which can readily be decoupled from engine and from transmission so that the engine can operate without shaft or transmission attached and, furthermore, to readily engage the engine to the transmission by coupling and locking the shaft therein between.

In general, the present invention comprises a shaft disposed between an associated drive means and an associated driven means and adapted to move axially from a coupled position to a decoupled position and vice versa for connecting and disconnecting the drive means and driven means, respectively: The shaft has a forward portion provided with means to engage to the drive means when in the coupled position so that torque is received by the shaft, and the shaft has an aft portion provided with means to engage to the driven means when in the coupled position so that torque is transferred to the driven means. Furthermore, a shifting mechanism is mounted adjacent the shaft and provided with an actuating means for coupling and uncoupling of the shaft and a gripping means adapted to grip and to hold the shaft's outer surface upon actuation of the actuating means, for shifting the shaft coincident to its own axis from a coupled position to an uncoupled position and to move the shaft from the uncoupled position to the coupled position and releasing the gripping means when in the coupled position whereby the engagement means of the forward and aft portion of the shaft becomes engaged to the drive and driven means respectively.

A full understanding of the invention and of its further objects and advantages will be had from the following description of an illustrative manner of carrying it out. The particulars of that description, of which the accompanying drawings form a part, are intended only as illustration of, and not as a limitation upon the scope of the invention, which is defined in the appended claims.

IN THE FIGURES

FIG. 2 is the same side view of the shaft in decoupled position.

FIG. 3 is a section view taken from FIG. 2 along the line 3—3.

DESCRIPTION AND OPERATION OF THE INVENTION

Figure 1:
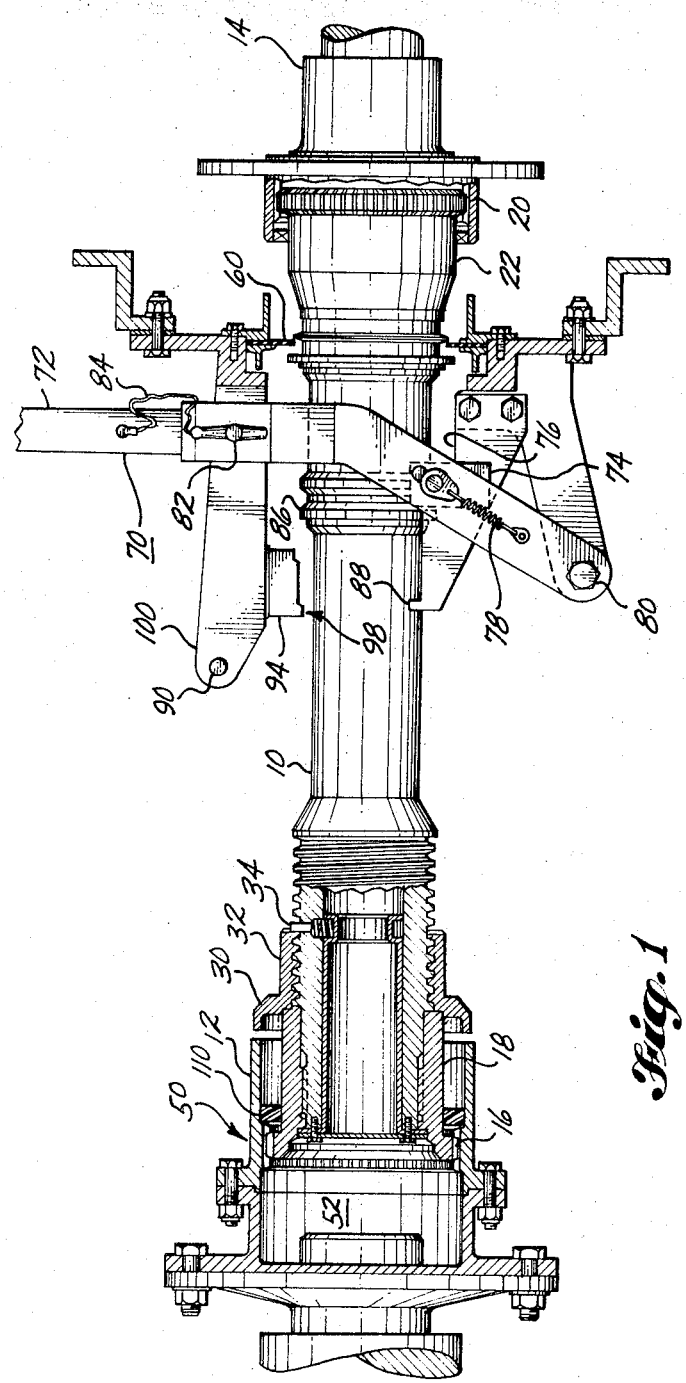
FIG. 1 is a side view partially in cross section of the shaft coupled between engine and transmission.

Referring now to FIG. 1, there is illustrated a power shaft or axle 10 positioned between a drive means or engine 12 and a driven means or transmission 14. The power shaft 10 is provided with engagement means 16 such as crown teeth or the like at the forward portion 18 of the shaft 10, and the same engagement arrangement 20 exists at the transmission end or aft portion 22 of the shaft 10.

During the coupled stage, the shaft 10 is prevented from axial movement or disengagement from the engagement means by a stop-locking means 30 comprising a collar 32 and a spring pin 34. The collar 32 is fixedly placed in position by the lock or spring pin 34 and thus retains the engagement means or crown teeth 16 and 20 in the drive means 12 and driven means 14, respectively.

The engine 12 has at the shaft receiving end 50 sufficient room 52 next to the crown teeth engagement 16 for receiving the forward portion 18 in a free but encapsulated manner during the shaft 10 decoupled position.

Since the engine shaft transmission is used in a marine craft, a flexible type of seal arrangement 60 between transmission and shaft 10 is provided to prevent water splashing during craft operation towards the power shaft arrangement, in the coupled or uncoupled position. This seal 60 is preferably carried by a housing or on a bulkhead or other adjacent craft structure which also carries a shifting mechanism 70.

Referring now also to FIG. 2 and FIG. 3 in combination with FIG. 1, there is shown a shifting mechanism 70 which is used to move the shaft axially forward towards the engine so that a decoupled condition exists and vice versa.

The mechanism 70 comprises an activating means or shift handle 72 carrying a gripping means or "V" yoke 74 which is guided over a cam 76 and is biasedly held against the cam 76 by a spring means 78. This spring 78 keeps the yoke 74 free from engagement to the shaft 10 during the coupled position of the shaft and also prevents rattling of the power shaft yoke during operational conditions. The handle 72 is pivotally mounted by a pivot 80 and thus adapted to move from a coupling position to an uncoupling position as shown in FIGS. 1 and 2, respectively. However, before moving the handles 72, a locking pin or bolt 82 has to be removed from the first handle position and can be reinserted for locking in the second handle position. The locking pin 82 is preferably fastened to the handle 72 by a retaining cord 84. During the movement of the handle 72, from the first to the second position, the following takes place: the "V" yoke 74 is slid upwards on the cam 76 and brought into engagement with the shaft 10 which has at that particular location a groove or shift land 86. As soon as the yoke grabs the shaft 10 at the shift land 86, the shaft 10 is moved forward or towards the drive means 12 along its own axis. The handle movement will come to a stop as soon as the "V" yoke reaches the stop portion 88 provided on the cam 76 which is "coincident" with the lining up of the aperture 90 for locking the handle by the locking pin 82 and stop portion 98 on the support block 94.

Referring now in particular to FIG. 2 and FIG. 3, it will be evident that simultaneously when the handle is moved in its second position, the "V" yoke grabs and holds the shaft 10 in a certain position which is supported and clamped by the support means 94 and 96, which are permanently mounted on the adjacent associated structure 100 of the craft. In addition, it should be noted that the seal 60 in the coupled position and the uncoupled position provides for a sealing performance.

The uncoupling operation of the shaft 10 starts with the removal of the stock-locking means 30 by manually depressing a spring pin 34 into the shaft and then rotating the collar 32 away from the drive means and accordingly relocking the collar 32 by the biased locking feature of the locking pin 34. After this first step, the shaft 10 can be axially moved by using the procedure as outlined above through the movement of the handle 72. As soon as the shaft 10 is positioned in the uncoupled position, the forward portion 16 and its engaging means 18 are freely arranged in room 52. A seal 110 is preferably disposed between the engine 12 and the forward portion 18 of the shaft 10 for retaining oil or the like; however, this seal is not intended to provide support of the shaft in the uncoupled position.

In order to position the shaft from the uncoupled to the coupled position, the same procedures as hereinbefore explained but in reversed order should be performed. Thus the locking pin 82 is removed, the handle 72 actuated, and the collar 32 returned to the locking position by manually depressing the locking means 34.

In the uncoupled position of the shaft, the engine is free to rotate and to be used for other purposes while the shaft is kept in a locked but non-engine or transmission engagement operating position.

It should be understood that only the preferred embodiment of the present invention has been disclosed and explained herin, and that other structural modifications may herein, and contemplated by those skilled in the art without departing from the spirit and scope of the invention as hereinafter defined by the appended claims.

Now, therefore, I claim:

1. A power shaft coupling arrangement comprising in combination:
   a. a shaft disposed between an associated drive means and an associated driven means and adapted to move axially from a coupled position to a decoupled position and vice versa for connecting and disconnecting said drive means and driven means, respectively;
   b. said shaft having a forward portion provided with means to engage to said drive means when in said coupled position so that torque is received by said shaft, and said shaft having an aft portion provided with means to engage to said driven means when in said coupled position so that torque is transferred to said driven means, and
   c. a shifting mechanism mounted adjacent said shaft provided with an actuating means for coupling and uncoupling of said shaft and a gripping means adapted to grip and to hold said shaft outer surface upon actuation of said actuating means for shifting said shaft coincident to its own axis from a coupled position to an uncoupled position and to move said shaft from said uncoupled position to said coupled position and releasing said gripping means when in said coupled position whereby said engagement means of said forward and aft portion of said shaft portion of said shaft becomes engaged to said drive and driven means respectively.

2. A power shaft coupling arrangement as claimed in claim 1 wherein said shifting mechanism mounted adjacent said shaft carries a fixedly mounted cam, said cam having a contoured surface for guiding said gripping means when said gripping means is actuated for movement by said actuating means so that said gripping means after gripping said shaft outer surface moves parallel to said shaft whereby axial shifting of said shaft is accomplished.

3. A power shaft coupling as claimed in claim 2 wherein spring means are provided for connecting said gripping means to said actuating means for biased attachment to said cam contour and for assuring disengagement of said gripping means from said shaft during said coupled position.

4. A power shaft as claimed in claim 3 wherein said shaft is provided with
   a. a shift land portion complementing with said gripping means during actuation of said actuating means and during said uncoupled position; and
   b. support means fixedly located adjacent said shaft adapted to make contact with said shift land portion when retaining said shaft into said uncoupled position together with said gripping means.

5. A power shaft as claimed in claim 4 wherein said shaft is provided with
   a. a stop-locking means including a locking means mechanism and retaining means, said retaining means adapted to prevent axial movement of said shaft during said coupled position so that said engagement means at said forward and said aft portion remain in an engaged condition, and
   b. said locking mechanism adapted to be manually operated for unlocking said retaining means when in said coupled position so that said retaining means is displaced in a stowing location and locked by said locking means to obtain free axial movement of said shaft for uncoupling thereof.

6. A power shaft as claimed in claim 5 wherein a sealing means of flexible material, for preventing liquid from entering said power shaft arrangement and shifting mechanism, is mounted between said aft portion and adjacent associated structure so that continued sealing is provided in said coupled and said uncoupled position.

7. A power shaft coupling arrangement comprising in combination: p1 a. a shaft having a forward portion, an inbetween portion and an aft portion;
   b. gear tooth means provided at said forward and said aft portion for complementing engagement with an associated drive means and an associated driven means, for receiving and transmitting torque, respectively; p1 c. a stop-locking means comprising a collar with locking pin for locking and retaining said shaft gear tooth means in coupled engagement with said associated drive and driven means; and
   d. a shifting mechanism mounted adjacent said shaft and provided with a pivotally mounted shift handle carrying a gripping means, said gripping means adapted to grab said shaft inbetween portion, so that said shaft, after said stop-locking means is manually unlocked and said handle is actuated, becomes movable in axial direction and said gripping means upon further actuation of said handle moves said shaft whereby both said gear tooth means disengage from said associated complementing engagements and said shaft becomes displaced coincident with its axis in an uncoupled condition.

8. A power shaft coupling arrangement as claimed in claim 7 wherein said shifting means employs a fixedly mounted cam for guiding said gripping means about during coupling and uncoupling of said shaft and wherein said gripping means is biasedly connected to said handle and held against said cam so that accurate movement of said gripping means by actuation of said shift handle is accomplished.

9. A power shaft coupling arrangement as claimed in claim 8 wherein said shifting means is provided with fixedly mounted support means which are positioned opposite of said gripping means so that said shaft in said uncoupled condition is held in axial alignment against and inbetween said support means and said gripping means.

10. A power shaft coupling arrangement as claimed in claim 9 wherein said shaft inbetween portion is provided with a shift land having a contour for receiving said gripping means and for engaging with said support means in said uncoupled displaced condition.

* * * * *